United States Patent
Shankarbabu et al.

(10) Patent No.: US 8,616,361 B1
(45) Date of Patent: Dec. 31, 2013

(54) DIVERTER ASSEMBLY

(75) Inventors: Veeravaniyan Shankarbabu, Singapore (SG); Kok Leng Lim, Singapore (SG)

(73) Assignee: Pteris Global Limited, Singapore (SG)

( * ) Notice: Subject to any disclaimer, the term of this patent is extended or adjusted under 35 U.S.C. 154(b) by 0 days.

(21) Appl. No.: 13/558,674

(22) Filed: Jul. 26, 2012

(51) Int. Cl.
*B65G 47/76* (2006.01)
*B65G 47/82* (2006.01)

(52) U.S. Cl.
CPC .............. *B65G 47/766* (2013.01); *B65G 47/82* (2013.01); *B65G 2201/0264* (2013.01)
USPC .................. 198/370.07; 198/370.08; 198/598

(58) Field of Classification Search
USPC ............................... 198/370.07, 370.08, 598, 198/457.06–457.07, 367–367.2
See application file for complete search history.

(56) References Cited

U.S. PATENT DOCUMENTS

| | | | |
|---|---|---|---|
| 5,010,998 A | 4/1991 | MacMillan | |
| 5,217,104 A * | 6/1993 | Pelletier | 198/367 |
| 5,452,786 A | 9/1995 | Gilmore | |
| 5,655,643 A | 8/1997 | Bonnet | |
| 5,988,356 A * | 11/1999 | Bonnet | 198/598 |
| 6,220,422 B1 * | 4/2001 | Lee | 198/370.07 |
| 6,974,020 B1 | 12/2005 | Peppel | |
| 7,819,233 B2 | 10/2010 | Van Schaijk et al. | |
| 8,132,661 B2 | 3/2012 | Van Schaijk et al. | |
| 8,146,730 B2 | 4/2012 | Sng et al. | |
| 2002/0070094 A1 | 6/2002 | Peppel | |
| 2010/0006393 A1 | 1/2010 | LeCroy | |
| 2012/0024661 A1 | 2/2012 | Wilson et al. | |

FOREIGN PATENT DOCUMENTS

EP 1828033 4/2011

OTHER PUBLICATIONS

G&T Conveyor Company Inc., "Power Face Diverter", www.gtconveyor.com, http://www.gtconveyor.com/images/google/pdfs/pfd_2012.pdf.
Wilson et al., U.S. Appl. No. 12/848,798, Aug. 2, 2010, 86 pp.

* cited by examiner

*Primary Examiner* — Mark A Deuble
(74) *Attorney, Agent, or Firm* — Volpe and Koenig, P.C.

(57) ABSTRACT

According to one aspect, there is provided a diverter assembly for diverting articles on a load bearing surface of a conveyor, the diverter assembly comprising: a base frame; a slider assembly that is movable with respect to the base frame; a deflector pivotally connected to the slider assembly, the deflector pivoting between a passive position, in which the deflector extends generally along the base frame to allow articles on the conveyor to pass freely, and an active position in which the deflector extends away from the base frame to divert articles on the conveyor; and a crank link configured to reciprocate the slider assembly while rotating in a single direction.

20 Claims, 12 Drawing Sheets

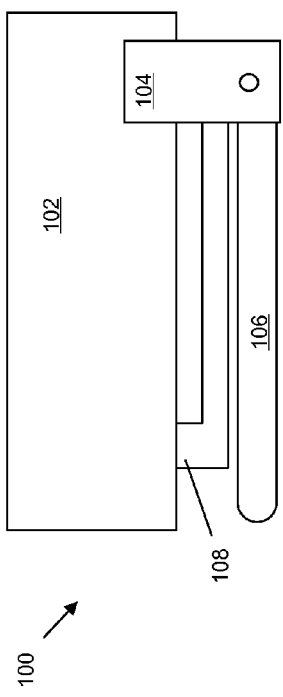
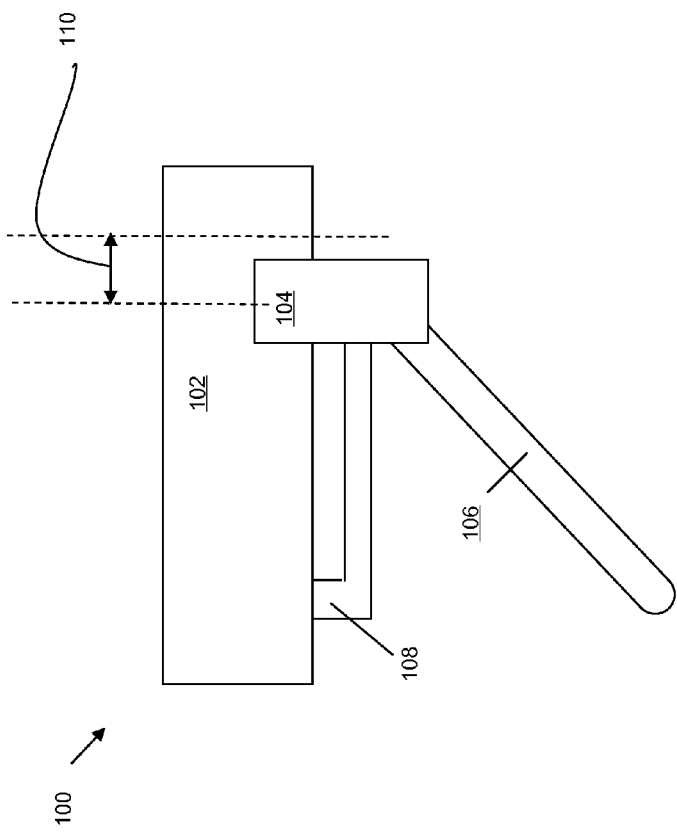

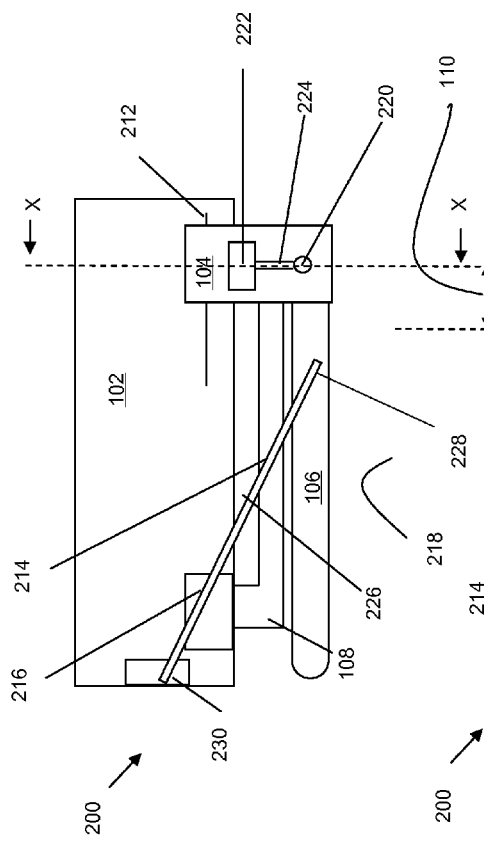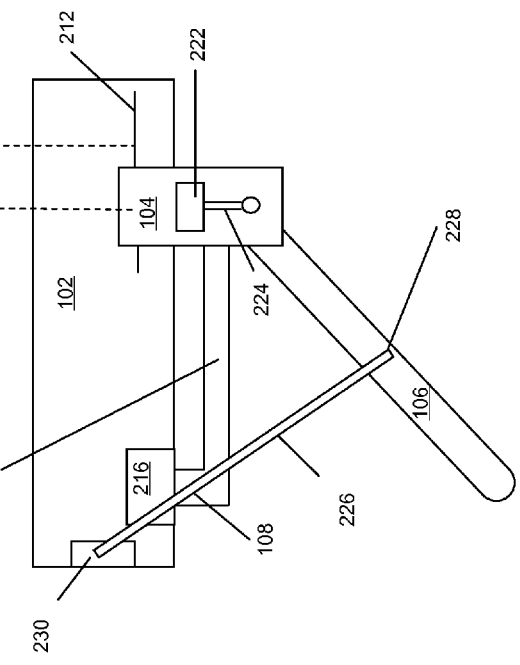

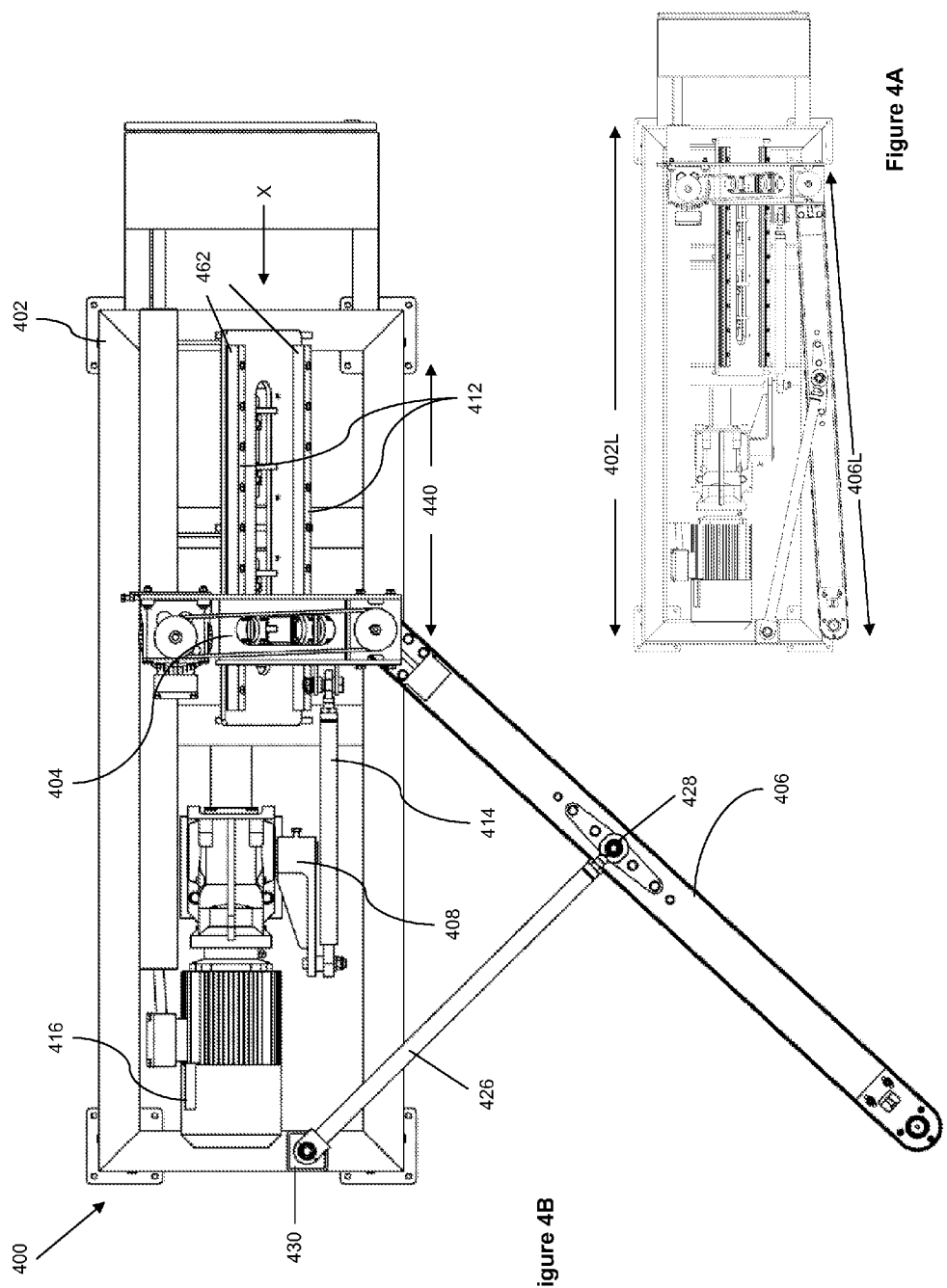

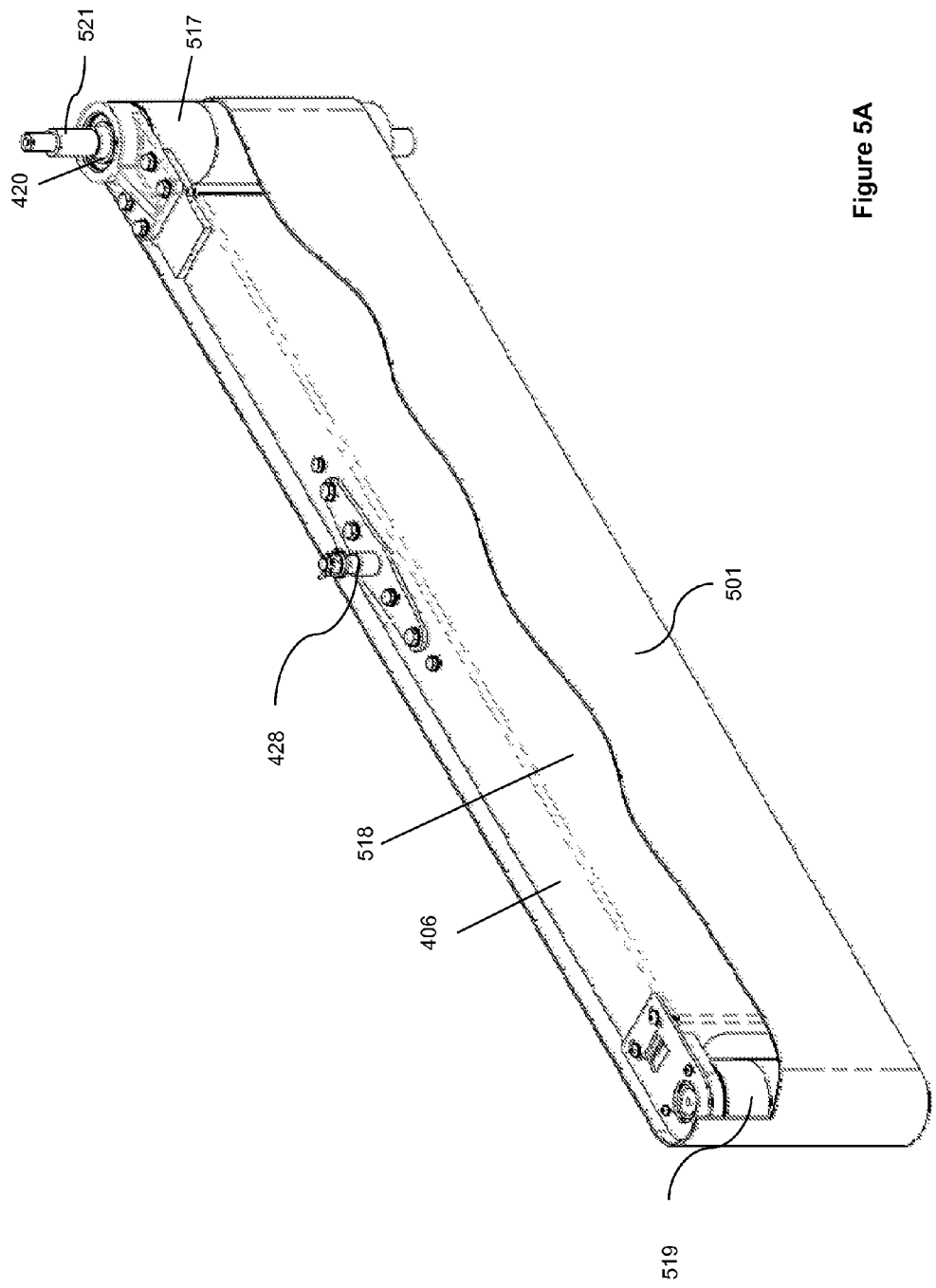

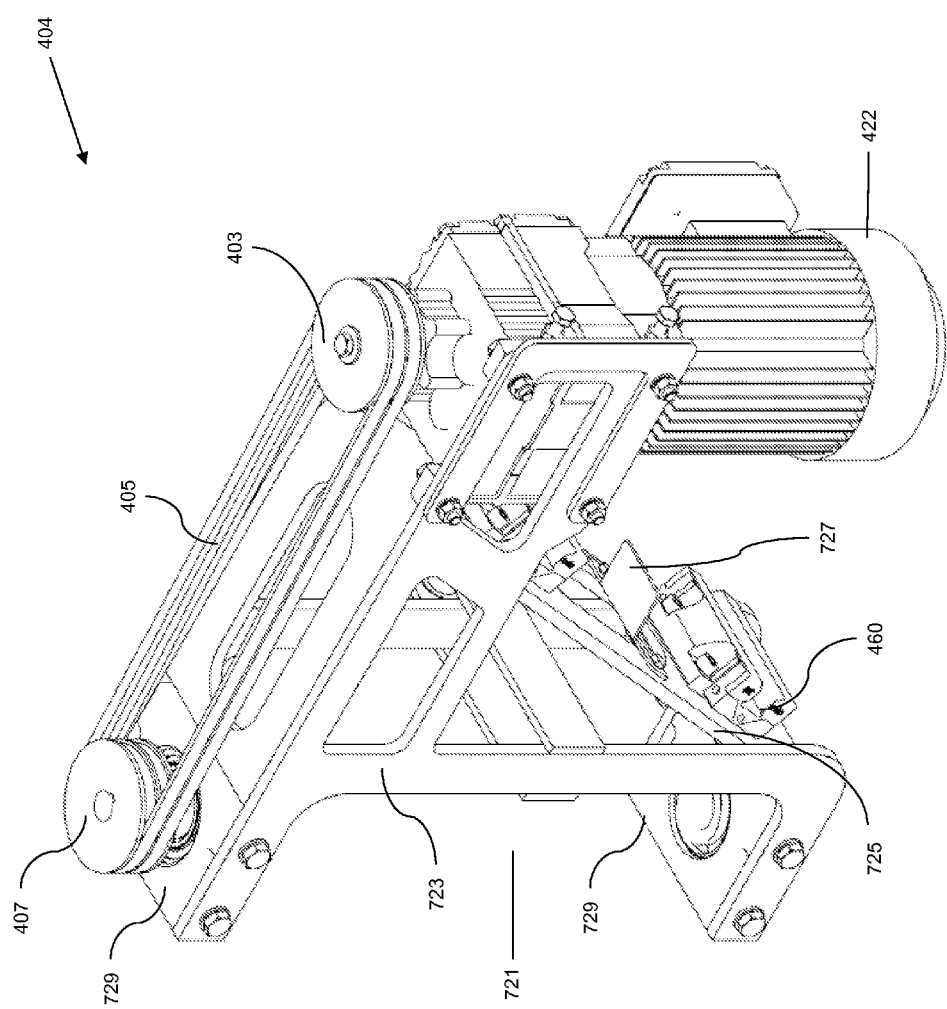

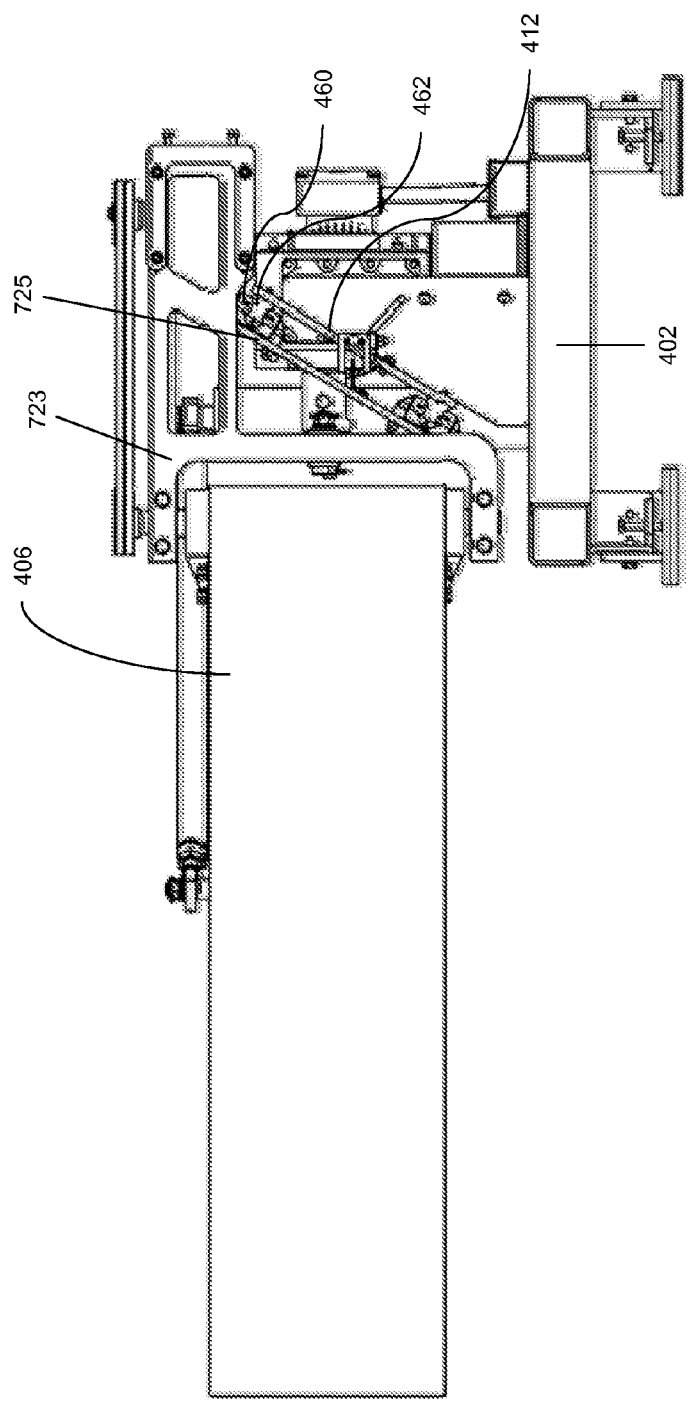

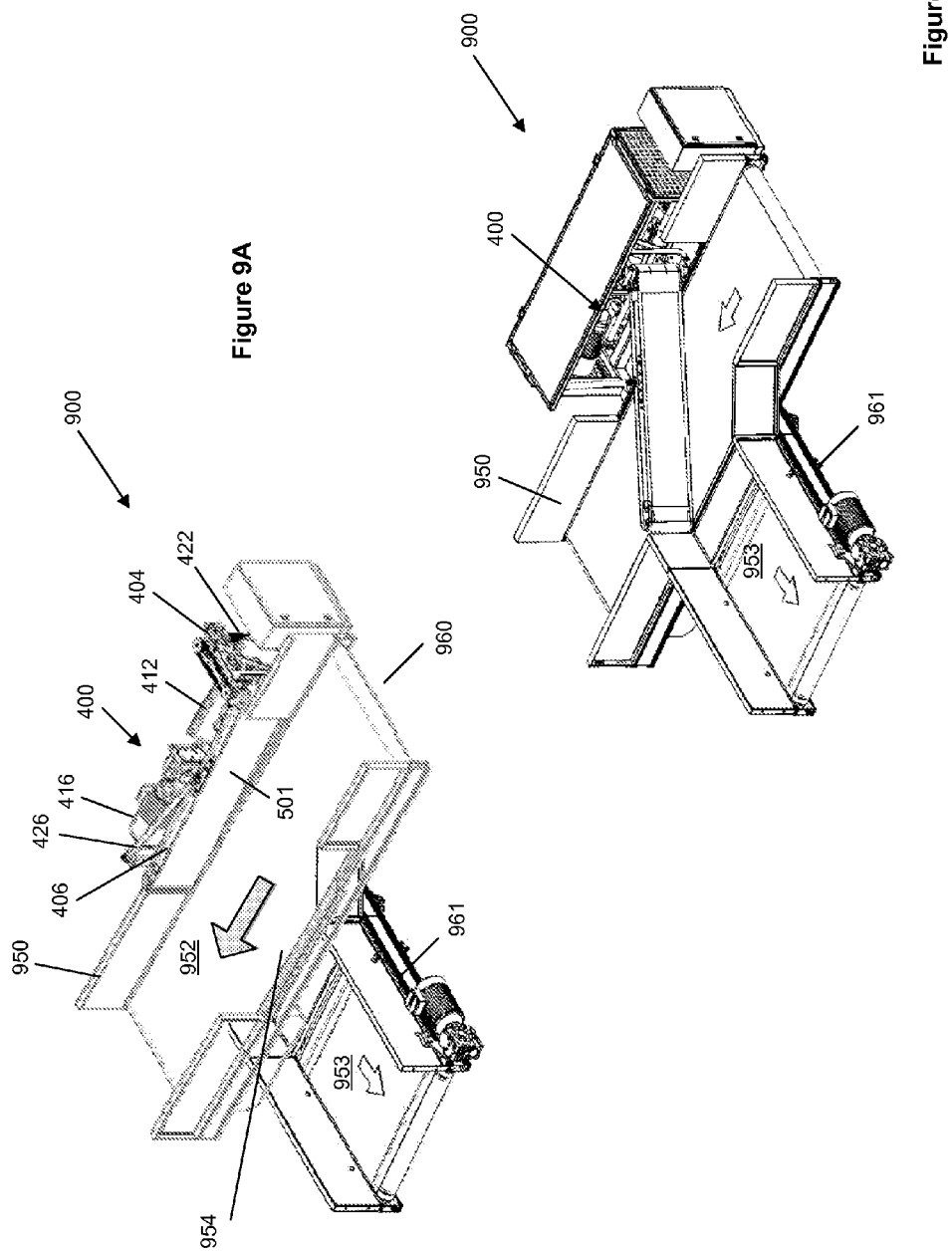

DIVERTER ASSEMBLY

FIELD OF INVENTION

Various embodiments relate to a diverter assembly for diverting articles on a load bearing surface of a conveyor.

BACKGROUND

Conveying and diverting devices are used in a belt conveyor system to sort articles, parcels or the like. Such a belt conveyor system comprises a primary belt conveyor, along which a diverter arm or deflector is positioned. The diverter arm extends parallel to the direction of transport along the primary belt conveyor in passive position. The diverter arm pivots about a pivot shaft near an upstream end of the diverter arm to active position in which the diverter arm extends at an angle of about 45 degrees above the primary belt conveyor. The diverter arm diverts parcels sideways from the primary belt conveyor onto a secondary belt conveyor that branches off the primary belt conveyor.

In such known designs, the diverter arm may abruptly extend when diverting articles or parcels, so that the articles or parcels experience a high impact and as a result may get damaged when being diverted. The present invention seeks to achieve diverting articles or parcels with less impact compared to such known designs, using a simple mechanical arrangement.

SUMMARY

According to one aspect, there is provided a diverter assembly for diverting articles on a load bearing surface of a conveyor, the diverter assembly comprising: a base frame; a slider assembly that is movable with respect to the base frame; a deflector pivotally connected to the slider assembly, the deflector pivoting between a passive position, in which the deflector extends generally along the base frame to allow articles on the conveyor to pass freely, and an active position in which the deflector extends away from the base frame to divert articles on the conveyor and a crank link configured to reciprocate the slider assembly while rotating in a single direction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIGS. 1A and 1B show block diagram representations of a diverter assembly according to one embodiment.

FIGS. 2A and 2B show block diagram representations of a diverter assembly according to one embodiment.

FIGS. 4A and 4B show top views of a diverter assembly according to one embodiment.

FIG. 5A shows a perspective view of the deflector of the diverter assembly of FIGS. 4A and 4B, having a conveyor belt.

FIG. 7A shows a perspective view of the slider assembly of the diverter assembly of FIG. 4B.

FIG. 8 shows a cross-section view of the slider assembly of the diverter assembly of FIG. 4B.

FIGS. 9A and 9B show a conveyor system having a primary belt conveyor, a secondary belt conveyor and the diverter assembly of FIGS. 4A and 4B.

DEFINITIONS

Figure 3B:
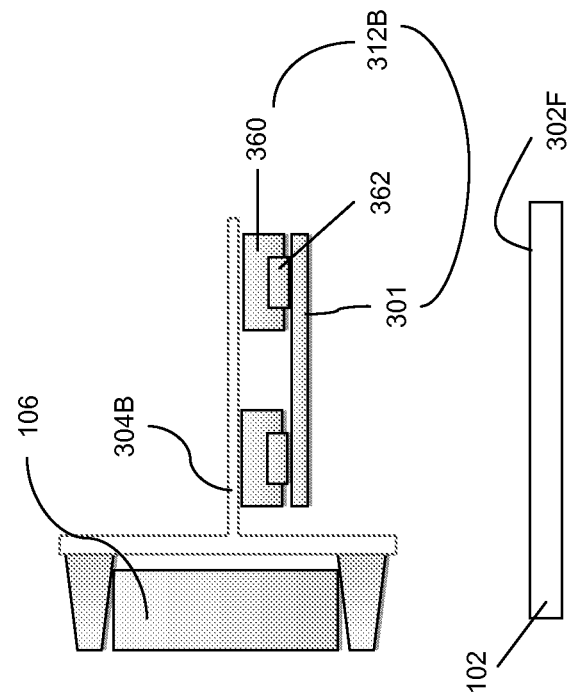
FIGS. 3A to 3D each show a cross-sectional view of various structural configurations for a slider assembly according to one embodiment.

The following provides sample, but not exhaustive, definitions for expressions used throughout various embodiments disclosed herein.

The term "diverter assembly" may refer a number of parts to make a machine that is used in a conveyor system that includes a primary belt conveyor next to which the diverter assembly is placed. When activated, the diverter assembly diverts articles from a path provided by the primary belt conveyor transporting the articles, to another path provided by a secondary belt conveyor that receives the articles.

The term "base frame" may mean a platform or main structure for mounting all parts of the diverter assembly. The manner of mounting may be direct or indirect. In various embodiments, an indirect mount may be when a part is coupled to the base frame through one or more connecting components. Consider a deflector, which is the component of the diverter assembly that diverts articles from the primary belt conveyor to the secondary belt conveyor. In one embodiment, the deflector may be pivotally connected to a slider assembly, wherein the slider assembly is coupled to the base frame by a slide, so that the deflector is indirectly mounted to the base frame.

The term "movable" may mean a linear movement. In various embodiments, where the slider assembly is movable with respect to the base frame, the slider assembly may slide along an established path with respect to the base frame. The path may be provided by a portion of the base frame, such as a guide or rail which is integral with the base frame, in one embodiment. In another embodiment, the guide may be coupled to the base frame, i.e. a separate component to the base frame.

The term "extends generally along the base frame" may mean that the deflector is in a position which is sufficient to let articles be conveyed past the diverter assembly, i.e. the deflector will not obstruct articles moving on the primary conveyor. In one embodiment, where the deflector is in the passive position, "generally" includes that the deflector will pivot until it is substantially in parallel to the direction of transport along the primary belt conveyor.

In various embodiments, a "crank link" may be a linkage mechanism that converts circular motion into reciprocating motion. The linkage mechanism may include a connecting rod, referred to in various embodiments as a "crank connecting arm", connected at one end to the crank link. As the deflector pivots between the passive position and the active position, the end of the connecting rod attached to the crank link traces a circular path, while the other end of the connecting rod is constrained to move in a linear sliding motion with respect to the base frame, by the slider assembly to which the crank link is configured to reciprocate. In various embodiments, the crank link is an arm attached at right angles to a rotating shaft, such as the rotating shaft of a motor.

In various embodiments, the term "guide" may mean a rail structure. The term "coupled" means that two parts may be directly connected together or through one or more connecting components.

DETAILED DESCRIPTION OF THE PREFERRED EMBODIMENTS

FIGS. 1A and 1B show block diagram representations of a diverter assembly 100 according to one embodiment. FIG. 1A shows the diverter assembly 100 in a passive position. FIG. 1B shows the diverter assembly 100 in an active position.

The diverter assembly 100 is for diverting articles on a load bearing surface of a conveyor (not shown for the sake of simplicity in FIGS. 1A and 1B, but shown as reference numeral 960 in FIGS. 9A and 9B). The diverter assembly 100 includes: a base frame 102; a slider assembly 104 that is movable with respect to the base frame 102; a deflector 106 pivotally connected to the slider assembly 104; and a crank link 108 configured to reciprocate the slider assembly 104 while rotating in a single direction. The deflector 106 pivots between a passive position (see FIG. 1A), in which the deflector 106 extends generally along the base frame 102 to allow articles on the conveyor to pass freely, and an active position (see FIG. 1B) in which the deflector 106 extends away from the base frame 102 to divert articles on the conveyor.

As the crank link 108 rotates in either a clockwise or anti-clockwise direction, it causes the slider assembly 104 to translate 110 in a reciprocal manner along the base frame 102, i.e. to slide between two ends of the path along which the slider assembly 104 is configured to move. The deflector 106 is configured to also simultaneously pivot as the slider assembly 104 moves. From the passive position shown in FIG. 1A (where the deflector 106 extends generally along the base frame 102), movement of the slider assembly 104 causes the deflector 106 to start pivoting and extending away from the base frame 102. Accordingly, full pivoting of the deflector 106 occurs over a translation distance 110 undertaken by the slider assembly 104. Such a simultaneous translation and pivoting of the deflector 106 provides for the deflector 106 to contact and move along with an article that is to be diverted, while pushing the article to its diverted path. Thus, the article experiences a softer impact, while being diverted, as opposed to having the deflector 106 remain at a fixed pivoting point relative to the base frame 102.

In addition, the crank link 108 is configured to reciprocate the slider assembly 104, so as to have the deflector 106 alternate between its passive position and its active position. Configuring the crank link 108 to rotate in a single direction reduces the mechanical stress experienced by a motor providing the power source to reciprocate the slider assembly 104. Such a motor will have a longer mean time to failure compared to a motor which alternates between providing a clockwise rotation and an anti-clockwise rotation to have the deflector 106 pivot between the passive position and the active position. In addition, synchronisation is simplified, since a same motor (i.e. the one which powers the crank link 108) is used to reciprocate the slider assembly 104 and pivot the deflector 106. Thus, various embodiments that use such a crank link 108 have a simple mechanical arrangement.

FIGS. 2A and 2B show block diagram representations of a diverter assembly 200 according to one embodiment. FIG. 2A shows the diverter assembly 200 in a passive position. FIG. 2B shows the diverter assembly 200 in an active position.

The diverter assembly 200 uses the base frame 102, the slider assembly 104, the deflector 106 and the crank link 108 of the diverter assembly 100 shown in FIGS. 1A and 1B.

In addition to the components and their associated functions described with respect to FIGS. 1A and 1B above, the diverter assembly 200 of FIGS. 2A and 2B has the following further components.

The diverter assembly 200 includes a guide 212 along which the slider assembly 104 is coupled to slide. In one embodiment, the guide 212 is coupled to the base frame 102. In such an embodiment, the guide 212 is a separate component which is coupled by way of a suitable fastener, such as a nut and bolt assembly, screws or welded to the base frame 102. In another embodiment, the guide 212 is integral with the base frame 102. In such an embodiment, a mold used to fabricate the base frame 102 has a portion for realising the guide 212, so that the guide 212 is part of the shape of the base frame 102.

FIGS. 3A to 3D each show a partial cross-sectional view of the diverter assembly 200, when viewed in the direction X-X shown in FIG. 2A, having various structural configurations for the slider assembly 104 (denoted using the reference signs 304A, 304B, 304C and 304D respectively) and guide 212 (denoted using the reference signs 312A, 312B, 312C and 312D respectively). In FIGS. 3A to 3D, the guides 312A, 312B, 312C and 312D are each implemented using a guide mounting support structure 301 upon which a guide rail 362 is mounted.

Figure 3A:
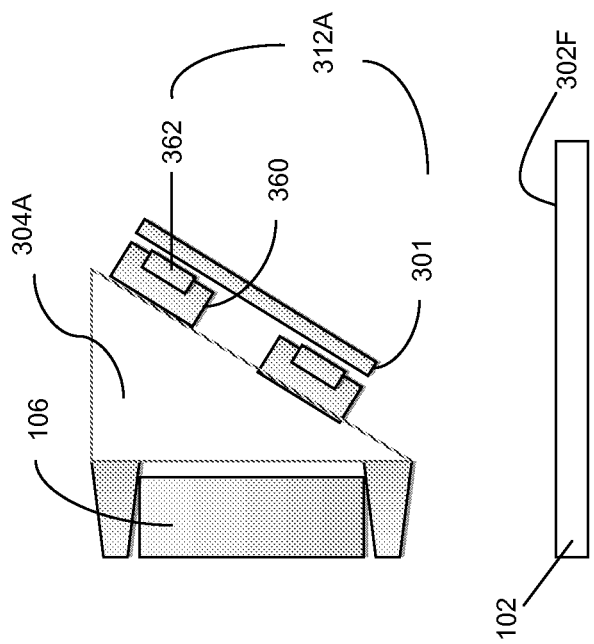

In FIG. 3A, the base frame 102 has a flat portion 302F that has a horizontal orientation when the base frame 102 is placed upright. In the configuration illustrated in FIG. 3A, the guide 312A is inclined with respect to the flat portion 302F of the base frame 102.

In FIG. 3B, the base frame 102 has a flat portion 302F that has a horizontal orientation when the base frame 102 is placed upright. In the configuration illustrated in FIG. 3B, the guide 312B is parallel with respect to the flat portion 302F of the base frame 102.

Figure 3D:
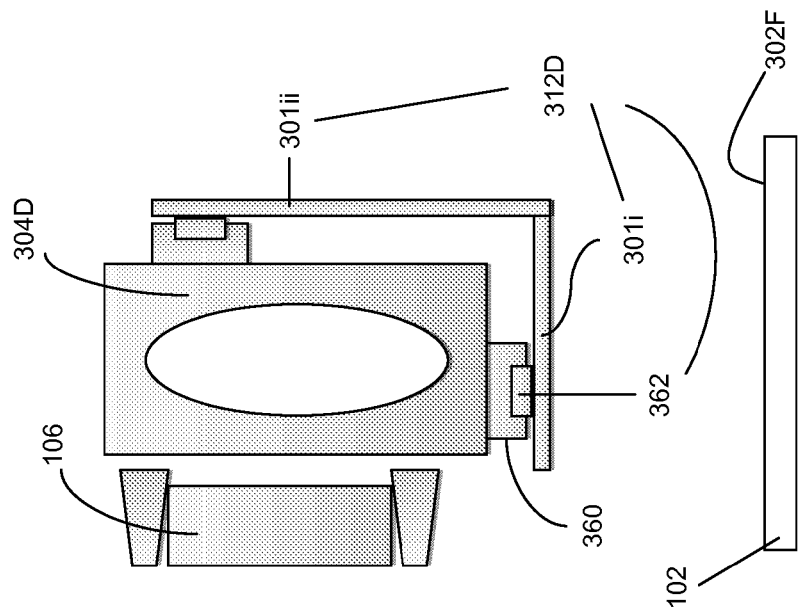
Figure 3C:
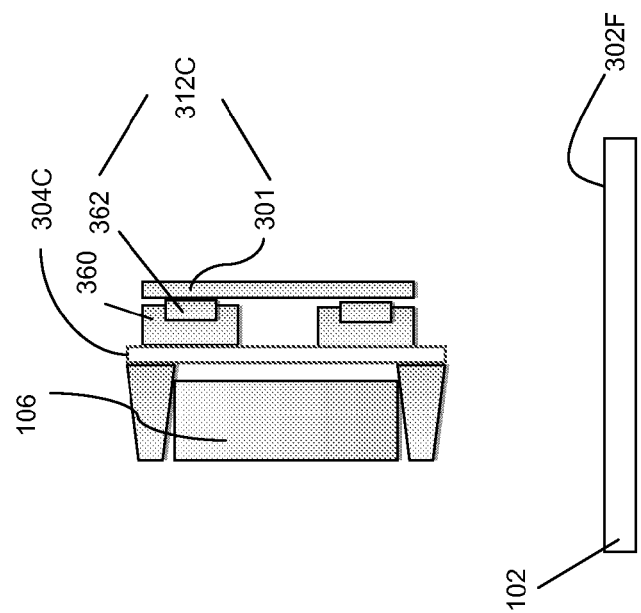

In FIG. 3C, the base frame 102 has a flat portion 302F that has a horizontal orientation when the base frame 102 is placed upright. In the configuration illustrated in FIG. 3C, the guide 312C is perpendicular with respect to the flat portion 302F of the base frame 102.

In FIG. 3D, the base frame 102 has a flat portion 302F that has a horizontal orientation when the base frame 102 is placed upright. In the configuration illustrated in FIG. 3D, the guide 312D has a first part 301i that is parallel with respect to the flat portion 302F of the base frame 102 and a second part 301ii that is perpendicular with respect to the flat portion 302F of the base frame 102.

FIGS. 3A to 3D also illustrate that each slider assembly 304A, 304B, 304C and 304D has at least one bearing 360. Each guide mounting support structure 301 has at least one guide rail 362. Each bearing 360 is allowed to slide along a respective guide rail 362, thereby allowing the slider assembly 304A, 304B, 304C and 304D to be movable on the base frame 102 to achieve the reciprocating movement of the slider assembly 200.

Returning to FIGS. 2A and 2B, the diverter assembly 200 includes a crank connecting arm 214 that is pivotally coupled at one end to the crank link 108 and pivotally coupled at the other end to the slider assembly 104. A motor 216 is coupled to drive the crank link 108 to rotate, wherein the motor 216 is coupled to the base frame 102.

The deflector 106 includes a deflecting surface 218 that is parallel to the axis of the pivot connection 220 of the deflector 106 to the slider assembly 104. A conveyor belt (not shown in the top views provided in FIGS. 2A and 2B, but see reference sign 501 of FIG. 5 which provides a partial cut-away view of a deflector according to another embodiment) passes over the deflecting surface 218 and loops at the two ends of the deflector 106.

A belt motor 222 may be provided on the slider assembly 104, the belt motor 222 coupled to drive the conveyor belt.

A pulley belt assembly 224 may be provided for coupling the belt motor 222 to the conveyor belt. In the embodiment shown in FIGS. 2A and 2B, the pulley belt assembly 224 may be provided on the slider assembly 104.

Figure 6:
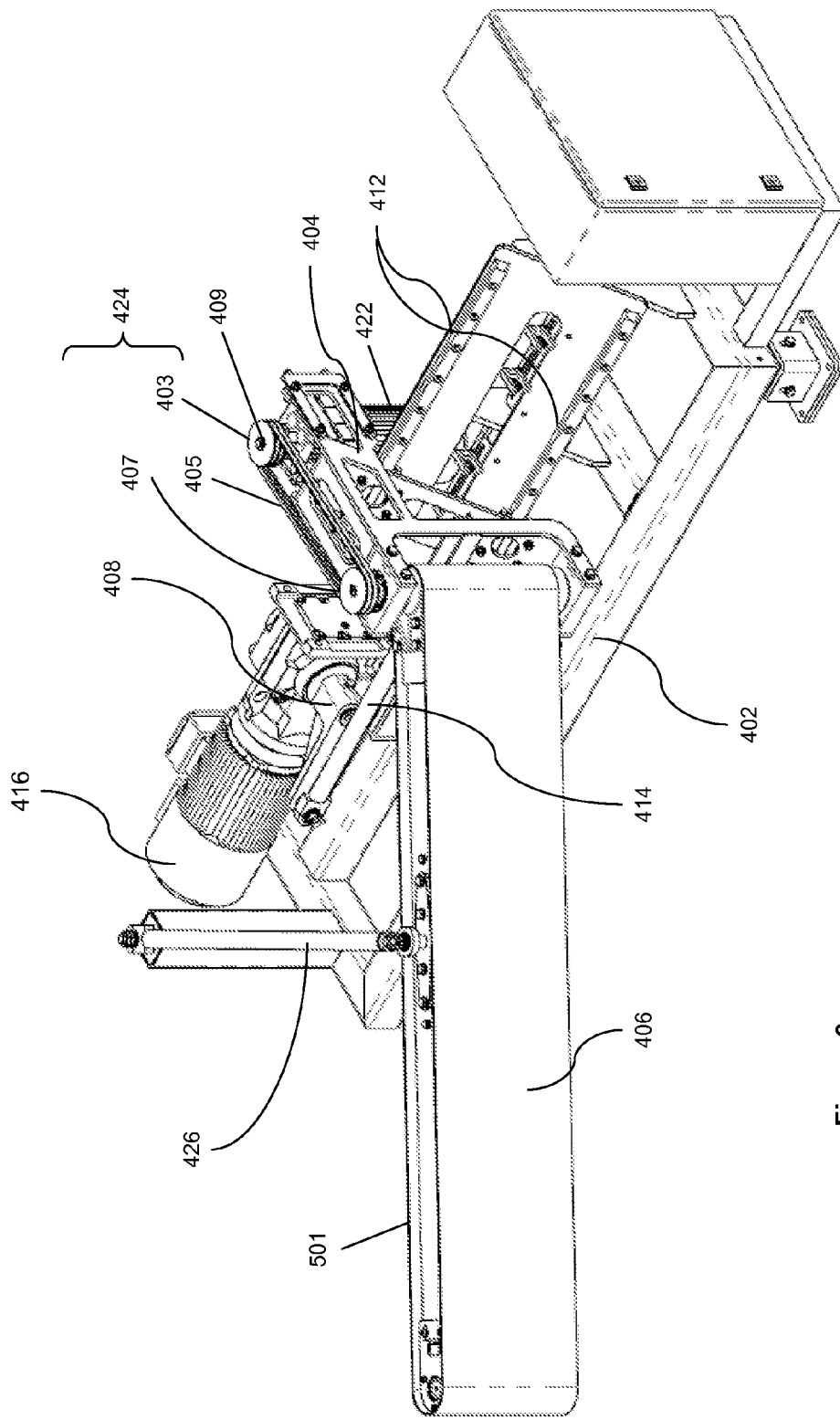
FIG. 6 shows a perspective view of the diverter assembly of FIG. 4B.

In one embodiment, the belt motor 222 drives the conveyor belt using the same pivot connection 220 through which the deflector is pivotally connected to the slider assembly. In this embodiment, the pulley belt assembly 224 may include a first pulley coupled to a drive shaft of the belt motor 222, the first pulley providing the pivot connection 220 through which the deflector is pivotally connected to the slider assembly; a second pulley coupled to the conveyor belt; and a belt that couples the first pulley to the second pulley by looping over the first pulley and the second pulley. (The first pulley, the second pulley and the belt that couples the first pulley to the second pulley is more clearly shown in FIG. 6, which is a perspective view of a diverter assembly according to another embodiment. In FIG. 6, the reference numeral 403 is used to denote the first pulley, the reference numeral 407 is used to denote the second pulley and the reference numeral 405 is used to denote the belt that couples the first pulley 403 to the second pulley 407. Reference numeral 422 is used to denote the belt motor of the diverter assembly of FIG. 6 and the reference numeral 409 used to denote the drive shaft of the belt motor 422.)

In another embodiment, the pulley belt assembly 224 may include a first pulley (not shown) coupled to a drive shaft of the belt motor 222, a second pulley (not shown) coupled to the conveyor belt and a belt that couples the first pulley to the second pulley by looping over the first pulley and the second pulley.

The diverter assembly 200 may further include a deflector link 226. The deflector 106 includes a pivot 228 to which one end of the deflector link 226 is coupled. The other end of the deflector link 226 is pivotal with respect to the base frame 102. The deflector link 226 restricts the degree of movement of the deflector 106, ensuring that the deflector 106 pivots between a passive position and an active position when the slider assembly 104 translates 110.

A post 230 may be provided on the base frame 102 and may protrude from the base frame 102. The other end of the deflector link 226 is pivotally coupled to the post 230. In the embodiment where the post 230 protrudes from the base frame 102, the pivot 228 is provided on the top surface of the deflector 106.

The pivot 228 may be in a fixed position with respect to the deflector 106.

The length of the base frame 102 along which the deflector 106 extends in the passive position is designed to be generally the same as the length of the deflector 106. This provides for a compact diverter assembly 200.

The diverter assembly 200 may be part of a conveyor belt frame (not shown in FIGS. 2A and 2B, but see FIG. 9B).

FIGS. 4A and 4B show top views of a diverter assembly 400 according to one embodiment. FIG. 4A shows the diverter assembly 400 in a passive position. FIG. 4B shows the diverter assembly 400 in an active position.

The diverter assembly 400 is for diverting articles on a load bearing surface of a conveyor (not shown for the sake of simplicity in FIGS. 4A and 4B, but shown as reference numeral 960 in FIGS. 9A and 9B). The diverter assembly 400 includes: a base frame 402; a slider assembly 404 that is movable with respect to the base frame 402; a deflector 406 pivotally connected to the slider assembly 404; and a crank link 408 configured to reciprocate the slider assembly 404 while rotating in a single direction. With reference to FIG. 4A, the length 402L of the base frame 402 along which the deflector 406 extends in the passive position is designed to be generally the same as the length 406L of the deflector 406. This provides for a compact diverter assembly 400.

The deflector 406 pivots between a passive position (see FIG. 4A), in which the deflector 406 extends generally along the base frame 402 to allow articles on the conveyor to pass freely, and an active position (see FIG. 4B) in which the deflector 406 extends away from the base frame 402 to divert articles on the conveyor.

The diverter assembly 400 includes a guide 412 along which the slider assembly 404 is coupled to slide. The guide 412 is coupled to the base frame 402 and configured to be inclined with respect to the base frame 402. Accordingly, the guide 412 has a cross-section that is similar to that of FIG. 3A (also see FIG. 8), when viewed at direction X. The slider assembly 404 may be provided with at least one bearing (denoted as reference numeral 460 in FIG. 7) which engages with a respective track 462 formed on the surface of the guide 412 which faces the slider assembly 404.

The diverter assembly 400 includes a crank connecting arm 414 that is pivotally coupled at one end to the crank link 408 and pivotally coupled at the other end to the slider assembly 404. A motor 416 is coupled to drive the crank link 408 to rotate, wherein the motor 416 is fixed to the base frame 402. The motor 416 has a shaft (not shown) for coupling the crank link 408 to the motor 416. The shaft is positioned such that the crank link 408 has a rotation axis that is generally perpendicular to the axis along which slider assembly 404 reciprocates; and the plane in which the crank link 408 rotates is generally perpendicular to the plane in which the deflector 406 pivots. In the embodiment shown in FIG. 4B, the mechanical linkage arrangement provided by the crank connecting arm 414 facilitates the reciprocal movement 440 of the slider assembly 404 when the motor 416 is operating.

The mechanical linkage arrangement works as follows. In FIG. 4B, the slider assembly 404 is at a left end of its reciprocal movement path 440. A clockwise or anti-clockwise rotation of the crank link 408 will cause the crank link 408 to move to the right, i.e. towards the slider assembly 404. The circular motion of the crank link 408 is converted to linear motion by the mechanical linkage arrangement provided by the crank connecting arm 414 being pivotally coupled at one end to the crank link 408 and pivotally coupled at the other end to the slider assembly 404. The crank connecting arm 414 transmits the driving force provided by the rotation of the crank link 408 to actuate the slider assembly 404 to the right, from being the connecting member between the slider assembly 404 and the crank link 408. During movement of the slider assembly 404, the crank connecting arm 414 will pivot both at the end connected to the crank link 408 and at the end connected to the slider assembly 404. When the slider assembly 404 reaches the right end of its reciprocal movement path 440, clockwise or anti-clockwise rotation of the crank link 408 will cause the crank link 408 to move to the left, i.e. away from the slider assembly 404, but yet pulling along the slider assembly 404 to the left.

Thus, as the motor 416 shaft drives the crank link 408 to rotate in either a clockwise or anti-clockwise direction, the slider assembly 404 will translate in a reciprocal manner along the base frame 402, i.e. to slide between two ends of the path along which the slider assembly 404 is configured to move. The coupling arrangement of the crank link 408 and the crank connecting arm 414 allows for continuous single direction rotation of the motor 416 shaft to reciprocate the slider assembly 404, so that the motor 416 shaft need not rotate in alternating rotation directions. This reduces the mean time to failure of the motor 416.

A post 430 may be provided on the base frame 402 to protrude from the base frame 402.

A deflector link 426 is coupled at one end to a pivot 428 provided on the top surface of the deflector 406. The other end of the deflector link 426 is pivotally coupled to the post 430.

The deflector link 426 reacts to the movement of the slider assembly 404, ensuring that the deflector 406 pivots between the passive position (shown in FIG. 4A, where the deflector 406 extends generally along the base frame 402) and the active position (shown in FIG. 4B, where the deflector 406 extends away from the base frame 402) when the slider assembly 404 undergoes reciprocal movement 440. Accordingly, the deflector link 426 converts the linear motion of the slider assembly 404 into angular motion of the deflector 406.

The deflector link 426 configures the deflector 406 to simultaneously pivot as the slider assembly 404 moves. From the passive position shown in FIG. 4A, movement of the slider assembly 404 causes the deflector 406 to start pivoting and extending away from the base frame 402. Accordingly, full pivoting of the deflector 406 occurs over the reciprocal movement 440 undertaken by the slider assembly 404. Such a simultaneous translation and pivoting of the deflector 406 provides for the deflector 406 to synchronize and move along with the article that is to be diverted, while pushing the article to its diverted path. Thus, the article experiences a softer impact, while being diverted, as opposed to having the deflector 406 remain at a fixed pivoting point relative to the base frame 402.

FIG. 5A shows a perspective view of the deflector 406 of the diverter assembly 400 of FIGS. 4A and 4B, having a conveyor belt 501 (a partial cut-away view is shown) passing over the deflecting surface 518 of the deflector 406. The deflecting surface 518 is parallel to the axis of the pivot connection 420 of the deflector 406 to the slider assembly 404 (see FIG. 4B). The conveyor belt 501 passes over the deflecting surface 518 to loop at the two ends of the deflector 406. In the embodiment shown in FIG. 5A, a pulley (517, 519) is provided at each end of the deflector 406. The conveyor belt 501 is also looped over these pulleys 517 and 519. The conveyor belt 501 is actuated by rotating a drive shaft 521 of the pulley 517. The rotation axis of the drive shaft 521 is aligned with the rotation axis of the pivot connection 420. Actuation of the conveyor belt 501 starts when the deflector 406 is activated to divert an article. From FIG. 5A, it can be seen that the pivot 428 is in a fixed position with respect to the deflector.

Figure 5B:
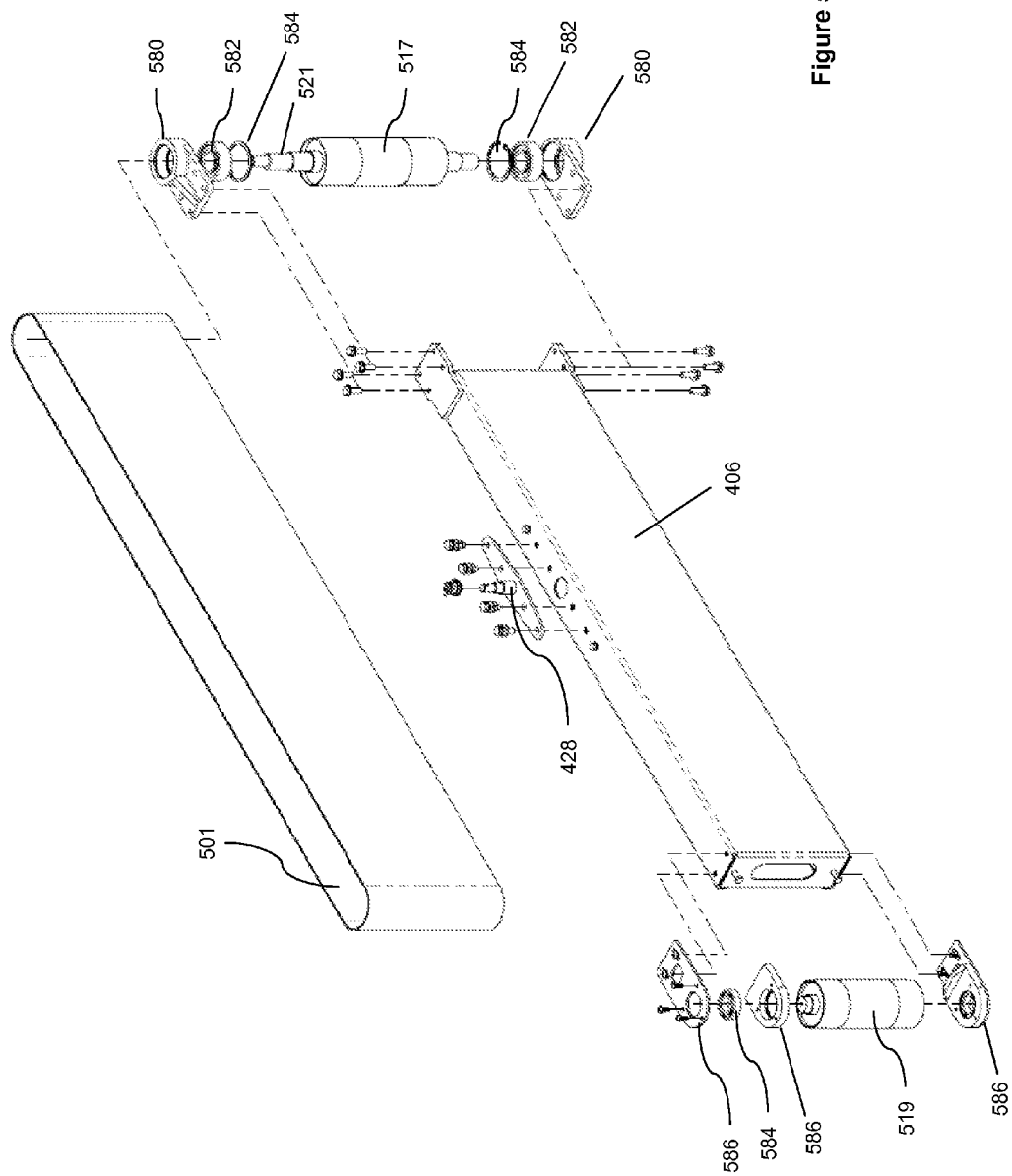
FIG. 5B shows an exploded view of FIG. 5A.

FIG. 5B shows an exploded view of FIG. 5A. FIG. 5B shows that each end of the pulley 517 is secured to the respective end of the deflector 406 by a bearing housing 580. The drive shaft 521 of the pulley 517 engages the bearing housing 580 through a bearing 582 that is accommodated by the opening of the bearing housing 580. A circlip 584 secures the bearing 582 to the bearing housing 580. The bearings 582 allow for the pulley 517 to rotate within the bearing housings 580 to actuate the conveyor belt 501 and, together with the pulley 517, provides the pivot connection 420 (see FIG. 5A) of the deflector 406 to the slider assembly 404.

This pivot connection 420 is used to drive the conveyor belt 501 and also used to allow the deflector 406 to be pivotally connected to the slider assembly 404. The inner ring of each of the bearings 582 is configured to rotate around the drive shaft 521 of the pulley 517 to allow for the deflector 406 to pivot relative to the slider assembly 404. When the pulley 517 is driven to actuate the conveyor belt 501, its drive shaft 521 is free to rotate within the inner ring of each of the bearings 582. The arrangement of the bearings 582 and the drive shaft 521 allows the pivot connection 420 to act as a common pivot connection for the pivoting required by the drive shaft 521 to drive the conveyor belt 501 and for allowing the deflector 406 to pivot relative to the slider assembly 404. This common pivot connection optimises the use of space and reduces parts required, when compared to using two separate pivot points, one to allow the deflector 406 to pivot and another to allow the conveyor belt 501 to operate.

Similar to the pulley 517, each end of the pulley 519 is secured to the respective end of the deflector 406 by a pulley plate 586. A shaft of the pulley 519 engages the pulley plate 586 through a bearing 584 that is accommodated in an opening of a bearing mount 586.

FIG. 6 shows a perspective view of the diverter assembly 400 of FIG. 4B. A belt motor 422 is provided on the slider assembly 404, the belt motor 422 coupled to drive the conveyor belt 501. A pulley belt assembly 424, provided on the slider assembly 404, couples the belt motor 422 to the conveyor belt 501.

The pulley belt assembly 424 includes a first pulley 403 coupled to a drive shaft 409 of the belt motor 422, a second pulley 407 coupled to the conveyor belt 501 and a belt 405 that couples the first pulley 403 to the second pulley 407 by looping over the first pulley 403 and the second pulley 407.

The pulley belt assembly is more clearly illustrated in FIG. 7A, which shows a perspective view of the slider assembly 404 of FIG. 4B.

The slider assembly 404 has a frame 723 to which the first pulley 403, the second pulley 407 and the belt motor 422 are coupled. The second pulley 407 is coupled to the frame 723 by a bearing unit 729.

The frame 723 has an inclined portion 725 having a bearing structure 460 and a kick plate 727. The bearing structure 460 couples the slider assembly 404 to a respective track 462 of the guide 412 of the base frame 402 (see FIG. 4B).

The deflector 406 (see FIG. 5A) is accommodated by the space 721 between the bearing units 729 of the slider assembly frame 723 to be pivotally connected to the slider assembly 404.

Figure 7B:
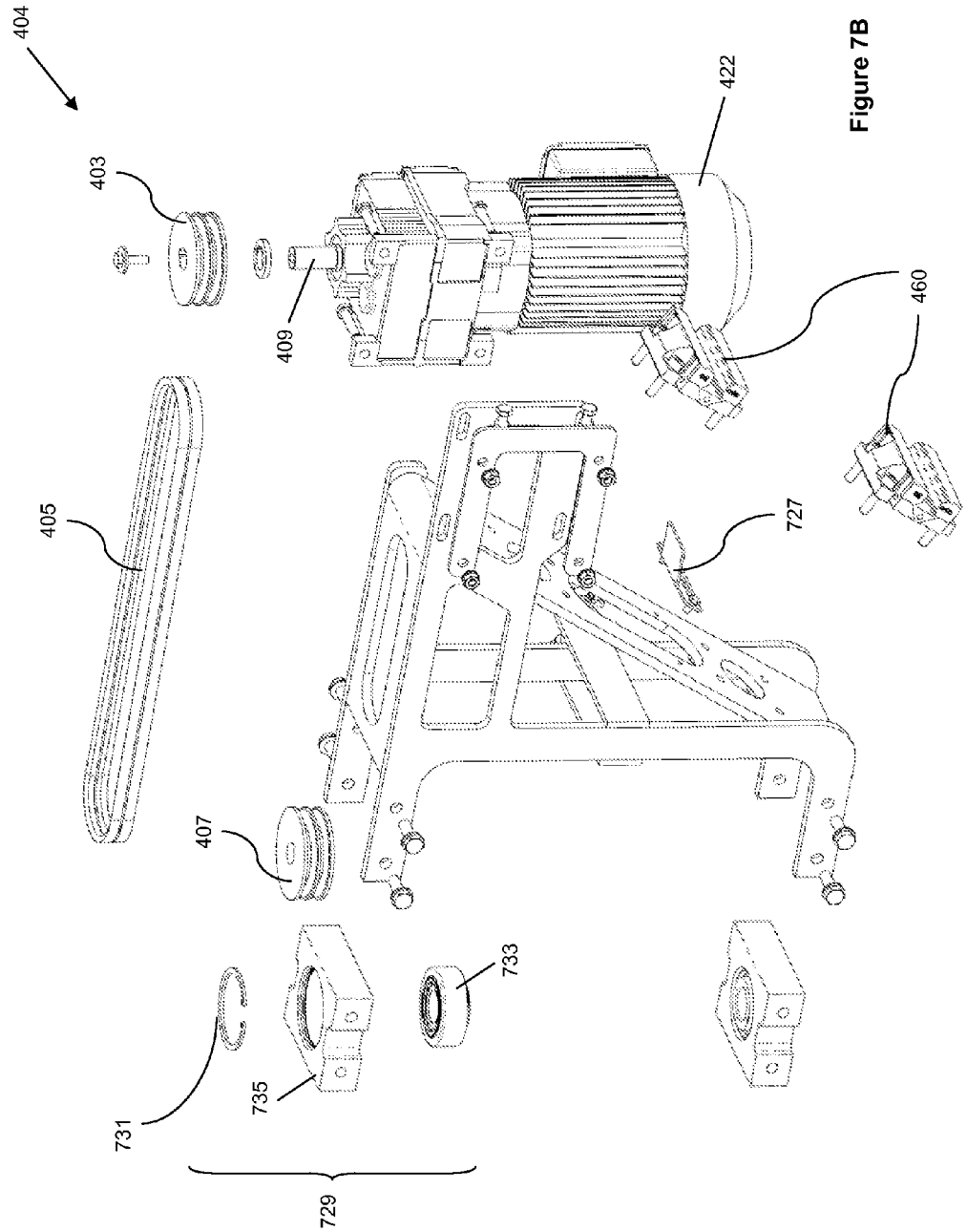
FIG. 7B shows an exploded view of the slider assembly of FIG. 7A.

FIG. 7B shows an exploded view of the slider assembly 404 of FIG. 7A. FIG. 7B shows that the bearing unit 729 includes a bearing mount 735 which accommodates a bearing 733. A circlip 731 secures the bearing 733 to the bearing mount 735.

FIG. 8 shows a cross-section view of the slider assembly 404 when viewed at direction X of FIG. 4B.

The bearing structure 460 of the inclined portion 725 engages with a respective track 462 formed on the surface of the guide 412.

FIGS. 9A and 9B show a conveyor system 900 having a primary belt conveyor 960, a secondary belt conveyor 961 and the diverter assembly 400 of FIGS. 4A and 4B. The primary belt conveyor 960 includes a conveyor belt 952 and a side frame 950. FIG. 9A shows the conveyor system 900 when the diverter assembly 400 is in a passive position. FIG. 9B shows the conveyor system 900 when the diverter assembly 400 is in an active position.

The conveyor system 900 functions as follows: as soon as a control system (not shown) detects that an article, that is to be diverted from the conveyor belt 952 to the conveyor belt 953 of the secondary belt conveyor 961, is approaching the diverter assembly 400, the motor 416 is actuated, causing the crank link 408 (see FIG. 4B) to rotate a half turn at first. The deflector link 426 pivots about the post 430, thereby imposing a pivoting movement about the pivot connection of the deflector 406 to the slider assembly 404, whilst also the slider assembly 404 will slide along the guide 412.

At approximately the same time the belt motor 422 will be actuated by the control system, as a result of which the conveyor belt 501 that loops over the deflector 406 is driven. The control system may be configured to be synchronised to the arrival of the article that is to be diverted, i.e. the control system activates the motor 416 and the belt motor 422 only when the article that is to be diverted is in proximity to the deflector 406, so that the deflector 406 moves along with the article to have a soft impact when pushing the article to its diverted path. The article will be diverted to an opening 954 on the conveyor belt 952 to the conveyor belt 953 through the opening 954.

After the article that is to be diverted has been discharged from the conveying surface of the conveyor belt 501, the motor 416 can rotate the crank link 418 a second half turn further so as to return the deflector 406 from the active position to the passive position.

It is possible for the control system to continuously have the deflector 406 alternate between its active and passive positions. On the other hand, it is possible for the crank link 408 to stop temporarily after a half turn by stopping the motor 416 temporarily. This sequence may be desirable, for example, when a number of successive articles present on the conveyor belt 501 are to be diverted by the deflector 406.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A diverter assembly for diverting articles on a load bearing surface of a conveyor, the diverter assembly comprising
   a base frame;
   a slider assembly that is movable with respect to the base frame;
   a deflector pivotally connected to the slider assembly, the deflector pivoting between a passive position, in which the deflector extends generally along the base frame to allow articles on the conveyor to pass freely, and an active position in which the deflector extends away from the base frame to divert articles on the conveyor; and
   a crank link configured to reciprocate the slider assembly while rotating in a single direction.

2. The diverter assembly of claim 1, further comprising a guide along which the slider assembly is coupled to slide, wherein the guide is coupled to the base frame.

3. The diverter assembly of claim 1, further comprising a guide along which the slider assembly is coupled to slide, wherein the guide is integral with the base frame.

4. The diverter assembly of claim 2, wherein the base frame has a flat portion that has a horizontal orientation when the base frame is placed upright, wherein the guide is inclined with respect to the flat portion.

5. The diverter assembly of claim 2, wherein the base frame has a flat portion that has a horizontal orientation when the base frame is placed upright, wherein the guide is parallel with respect to the flat portion.

6. The diverter assembly of claim 2, wherein the base frame has a flat portion that has a horizontal orientation when the base frame is placed upright, wherein the guide is perpendicular with respect to the flat portion.

7. The diverter assembly of claim 2, wherein the base frame has a flat portion that has a horizontal orientation when the base frame is placed upright, wherein the guide has a first part that is parallel with respect to the flat portion and a second part that is perpendicular with respect to the flat portion.

8. The diverter assembly of claim 1, further comprising a crank connecting arm that is pivotally coupled at one end to the crank link and pivotally coupled at the other end to the slider assembly.

9. The diverter assembly of claim 8, further comprising a motor that is coupled to drive the crank link to rotate, wherein the motor is coupled to the base frame.

10. The diverter assembly of claim 1, wherein the deflector comprises a deflecting surface that is parallel to the axis of the pivot connection of the deflector to the slider assembly and wherein the deflector comprises a conveyor belt that passes over the deflecting surface and loops at the two ends of the deflector.

11. The diverter assembly of claim 10, further comprising a belt motor provided on the slider assembly, the belt motor coupled to drive the conveyor belt.

12. The diverter assembly of claim 11, wherein the belt motor drives the conveyor belt using the same pivot connection through which the deflector is pivotally connected to the slider assembly.

13. The diverter assembly of claim 11, further comprising a pulley belt assembly for coupling the belt motor to the conveyor belt.

14. The diverter assembly of claim 13, wherein the pulley belt assembly comprises:
   a first pulley coupled to a drive shaft of the belt motor, the first pulley providing the pivot connection through which the deflector is pivotally connected to the slider assembly;
   a second pulley coupled to the conveyor belt; and
   a belt that couples the first pulley to the second pulley by looping over the first pulley and the second pulley.

15. The diverter assembly of claim 11, further comprising a pulley belt assembly for coupling the belt motor to the conveyor belt.

16. The diverter assembly of claim 15, wherein the pulley belt assembly comprises:
   a first pulley coupled to a drive shaft of the belt motor;
   a second pulley coupled to the conveyor belt; and
   a belt that couples the first pulley to the second pulley by looping over the first pulley and the second pulley.

17. The diverter assembly of claim 1, further comprising a deflector link, wherein the deflector comprises a pivot to which one end of the deflector connecting arm is coupled and the other end of the deflector connecting arm is pivotal with respect to the base frame.

18. The diverter assembly of claim 17, further comprising a post that protrudes from the base frame to which the other end of the deflector connecting arm is pivotally coupled and wherein the pivot is provided on the top surface of the deflector, wherein the pivot is in a fixed position with respect to the deflector.

19. The diverter of claim 1, wherein the length of the base frame along which the deflector extends in the passive position is generally the same as the length of the deflector.

20. A conveyor belt frame comprising the diverter assembly of claim 1.

* * * * *